July 14, 1953 T. E. McDOWELL ET AL 2,645,761
ILLUMINATION APPARATUS FOR WARNING AND SIGNALING PURPOSES
Filed April 14, 1951 3 Sheets-Sheet 2
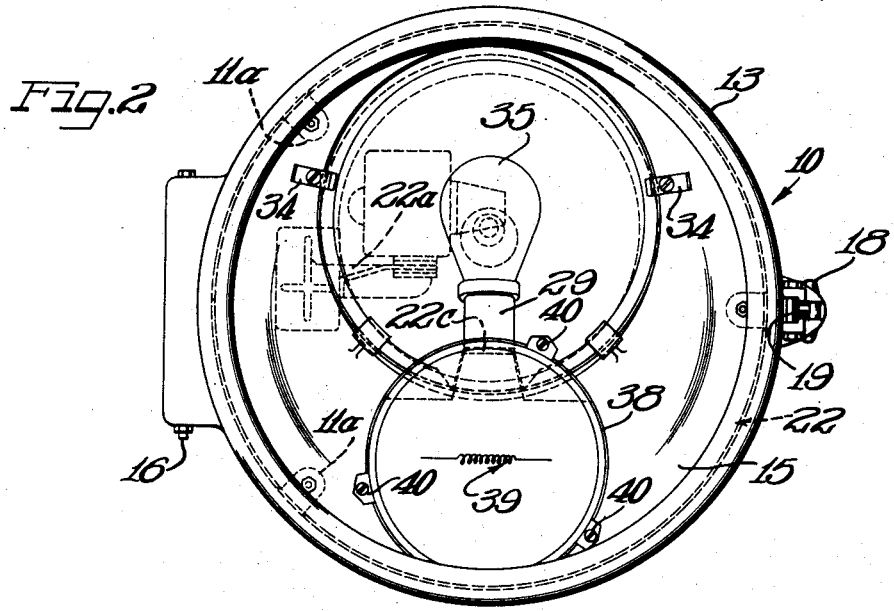
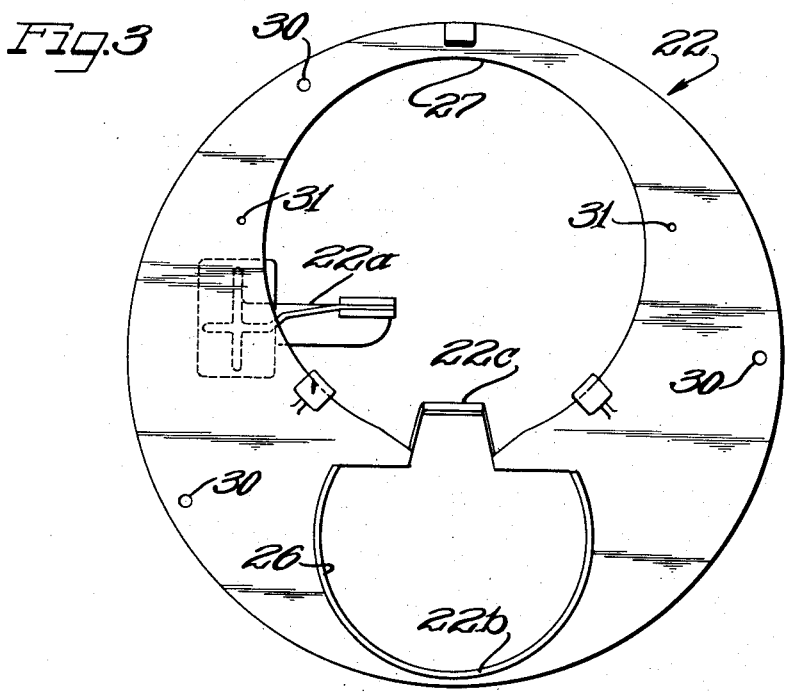
Inventors
Thomas E. McDowell
Arthur C. Heehler
by ︎ Attys

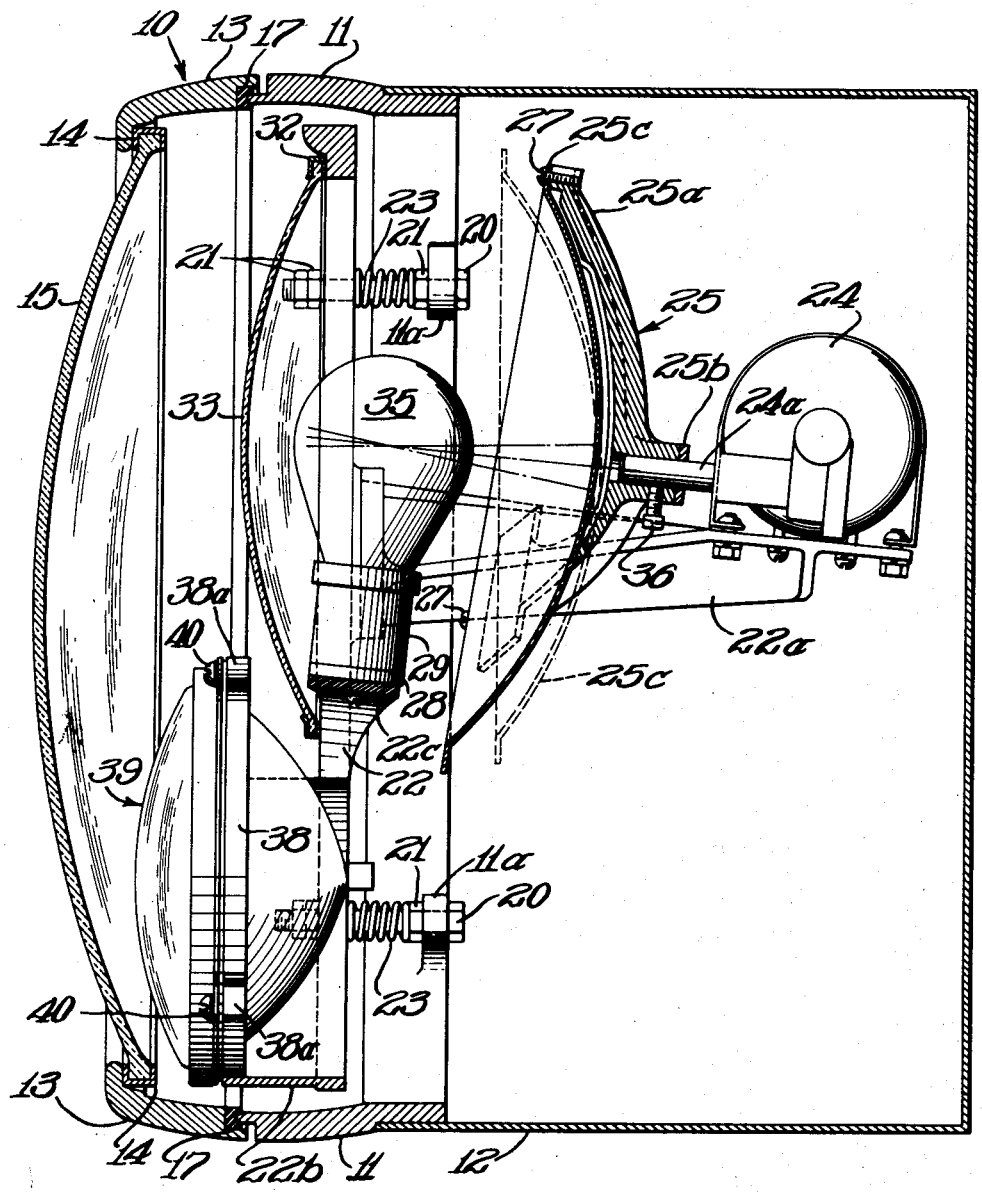

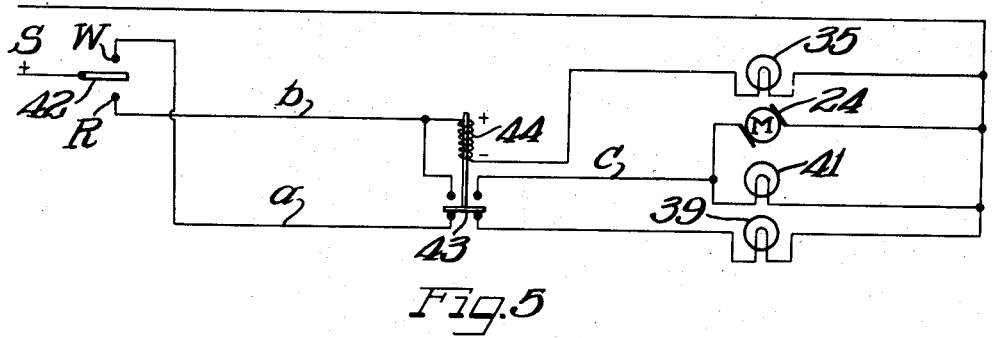
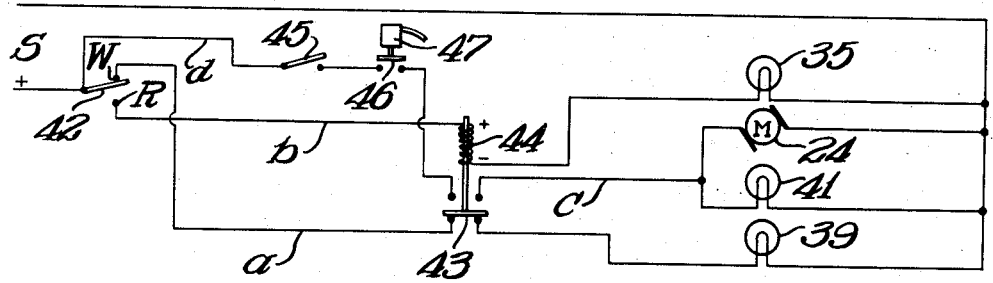
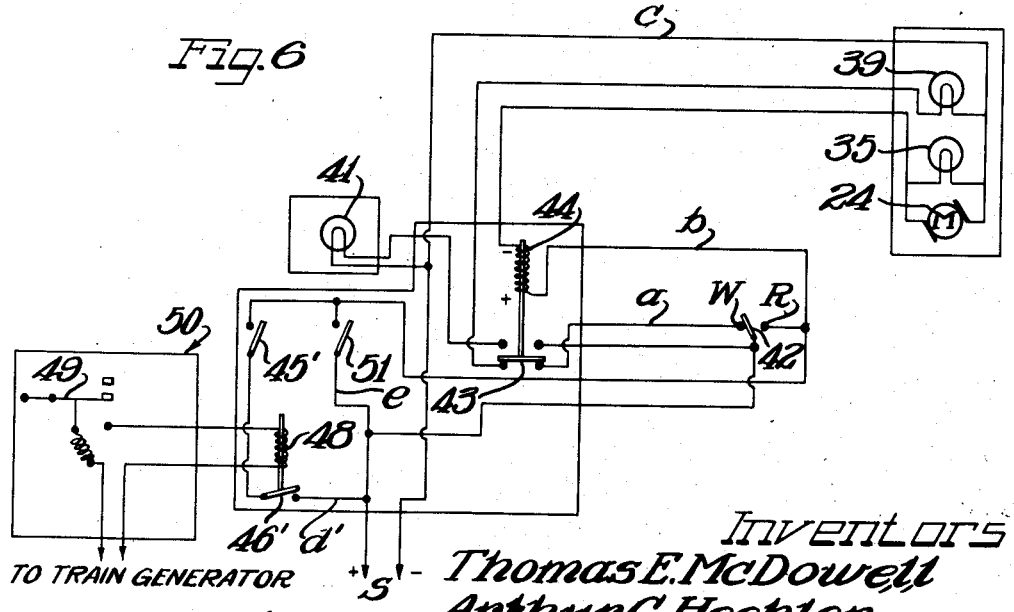

Patented July 14, 1953

2,645,761

UNITED STATES PATENT OFFICE 2,645,761

ILLUMINATION APPARATUS FOR WARNING AND SIGNALING PURPOSES

Thomas E. McDowell and Arthur C. Heehler, Chicago, Ill., assignors to The Pyle-National Company, Chicago, Ill., a corporation of New Jersey Application April 14, 1951, Serial No. 221,046

13 Claims. (Cl. 340—50)

This invention relates generally to illumination apparatus, and more specifically to lighting fixtures adapted to serve as warning lights on vehicles such as railroad trains and the like or as signal lights in various strategic locations.

Although the present invention may be of general utility, it finds a particularly useful application when installed on the last car of a railroad train or in a strategic location such as a switching yard or the like.

The instant invention provides a lighting fixture which is uniquely adaptable for serving a dual function, namely, as an auxiliary headlight for backing-up purposes and as a gyrating warning light which may be of a distinctive color for safety purposes as, for example, when the train upon which the lighting fixture is installed slows down or comes to a full stop.

It is, therefore, an object of this invention to provide an improved illumination apparatus comprising a combination spotlight or headlight and warning light suitable for use upon vehicles or for use in fixed installations in strategic locations.

Another object of this invention is to provide a combination headlight and warning light which is readily adaptable for automatically controlled operation.

A further object of this invention is to provide a control system for a combination headlight and warning light whereby the combination light may be selectively operated as an auxiliary backing-up light and as a warning light.

Yet another object of this invention is to provide a control system for a combination light fixture whereby the combination lights may be selectively operated to produce a stationary beam of light or to produce a gyrating warning light.

Another object of this invention is to provide a control system for a combination light of the type herein described which includes a pressure-responsive control device whereby the combination light automatically produces a gyrating warning light in response to the setting of brakes on the vehicle upon which the combination light may be carried.

A further object of this invention is to provide a control system for a combination light which includes elements responsive to the actuation of a voltage regulator on the generator normally carried by a railroad vehicle whereby the combination light will be automatically operated to produce a gyrating warning light upon reduction of the speed of the vehicle below a predetermined quantitative value.

Still another object of this invention is to provide methods of controlling a combination headlight and warning light whereby the combination light may be operated to produce a stationary beam of light as and for backing-up purposes, or to produce a gyrating warning light in response to conditions indicative of a departure from a normal condition.

It is believed that the methods of control practiced with the instant invention will be clearly understood from a description of the apparatus provided for practicing the same.

Many other objects and advantages of the instant invention will be manifest to those versed in the art through reference to the following detailed description and the accompanying drawings in which we have shown, by way of example, a preferred embodiment of a combination headlight and warning light embodying the principles of our invention.

On the drawings:

Figure 1 is a side elevational view partly in section of a combination light fixture embodying the principles of our invention;

Figure 2 is a front elevational view of the combination light fixture shown in Figure 1;

Figure 3 is a front elevational view of the novel and improved mounting plate incorporated in the instant apparatus;

Figure 4 is a circuit diagram illustrating one method of control which may be practiced with the instant apparatus;

Figure 5 is a circuit diagram illustrating an alternative method of control which may be practiced in the present invention; and Figure 6 is a circuit diagram illustrating yet another method of control which may be practiced with the present invention.

As shown on the drawings:

Referring generally to Figures 1 and 2, a combination lighting fixture is indicated generally by the reference numeral 10 and includes a casing or body member 11 substantially of annular shape and adapted to receive in surrounding relationship therewith a drum-type casing 12. A door 13 having mounted therein a lens gasket 14 and a lens 15 is arranged to pivot about a hinge stud 16 affixed to one side of the body 11. The door 13 can be locked in sealed engagement with the body 11 by bringing a gasket 17 seated within an annular recess in the door into sealing contact with an appropriate abutment formed on the body 11, after which a wing latch 18 pivotally mounted on a latch stud 19 affixed to the door 13 may be locked to an appropriate grooved extension of the body 11.

The body 11 is provided on its inner peripheral surface with a plurality of inwardly extending lugs, as at 11a, which may have suitable openings formed therein.

Extending through the openings of each of the lugs 11a is a cap screw 20 suitably threaded along its shank portion to receive a plurality of jam nuts 21. A unit holder or mounting plate 22 is carried by the cap screws 20 in such a manner as to permit selective positioning of the mounting plates relative to the case body 11. To that end, the cap screws 20 may be provided with resilient spring member 23 which may be interposed between the lugs 11a and the mounting plate 22 whereby the mounting plate 22 is normally biased away from the lugs 11a. It will be readily understood that the cap screws 20 could also be provided with an additional jam nut 21 instead of a resilient member 23, and selective positioning of the mounting plate 22 relative to the case body 11 would still be possible.

The details of the mounting plate structure are best seen through reference to Figures 1 and 3. As shown on the drawings, the mounting plate 22 is substantially of a circular configuration and is provided with a rearwardly extending support arm, as at 22a, suitable for receiving in mounted assembly thereon a motor 24 and a reflector apparatus indicated generally at 25.

The mounting plate 22 is further provided with a forwardly extending flange portion 22b which surrounds an aperture indicated at 26. A second aperture 27 is also defined by the mounting plate 22 and lies in spaced relationship to aperture 26 and substantially on a colinear axis extending vertically through the mounting plate 22.

The mounting plate 22 is shaped in such a manner as to define a platform portion 22c which lies at a point between the extremities of the aperture 26 and the aperture 27 and is adapted to receive a lamp adaptor 28 and a suitable socket 29 in firm assembly therewith.

As may be seen on Figure 3, the mounting plate 22 is provided with a plurality of suitable openings 30 for receiving the cap screws 20 as well as additional openings 31 adapted to hold a lens gasket 32 carrying a lens 33 by means of a plurality of screw-mounted lens clips 34. The lens 33 may be made of glass or plastic of any desired color and is preferably of clear red glass for use as a warning light.

The reflector apparatus 25 mounted on the support arm 22a is aligned in such a manner that the rays of light emanating from a bulb 35 which may be turned into the socket 29 will be reflected beyond the bulb 35 and through the lens 33.

The reflector apparatus 25 includes a reflector spider 25a and a reflector stop collar 25b which is rotatingly carried by the motor shaft 24a and securely locked thereto by means of a set screw 36. A substantially parabolic reflector 25c is mounted within the reflector spider by means of lock washers and reflector mounting screws 27 received by the arms of the reflector spider 25a.

It will be noted that the support arm 22a and the platform portion 22c are arranged to lie on an angularly displaced plane so that the axis of rotation of the shaft 24a is slightly inclined relative to the longitudinal axis of the fixture 10. The reflector spider 25a is constructed in such a manner as to have the bore of the stop collar 25b angularly eccentrically disposed relative to the peripheries of the arm portions of the spider.

Hence, when the shaft 24a is rotated by the motor 24, the arms of the reflector spider will move in a conically eccentric path with respect to the normal longitudinal fixture axis. This arrangement permits the motor 24 to rotate the reflector 25 to oscillate in such a manner as to produce a gyrating beam of light.

Referring further to Figures 1, 2 and 3, the fixture 10 is provided with a lamp ring 38 which is of a generally annular configuration and has a plurality of extending boss portions 38a. The lamp ring 38 may be seated within the flange 22b of the mounting plate 22. A sealed beam lamp unit 39 may be mounted within the lamp ring 38 by means of a plurality of fastening means 40.

It will be apparent that the mounting plate 22 is actually adjustably suspended within the case body 11 and adjustment of the mounting plate relative to the body of the fixture will result in a selective positioning of the optic axes of the projected beams of light emanating from the sealed beam lamp unit 39 and the gyrating warning light.

Turning now to Figures 4, 5 and 6, schematic wiring diagrams are shown illustrating how the present combination light fixture 10 may be controlled under different operating conditions.

It will be apparent that one or more pilot lights may be remotely located from the fixture 10 and arranged to afford convenient visible signals representative of the operating status of the various elements of the fixture. A preferred arrangement will be set forth in greater detail presently.

Referring first to Figure 4, the bulb 35, the motor 24, the sealed beam unit 39, and a pilot light 41 are shown interposed in an electric circuit connected to a suitable source of power indicated by the reference character S. A selector switch 42 is provided which may be selectively actuated to the position "W" for white operation and to the position "R" for red operation. If the switch 42 is moved to position "W," the current will flow from the positive terminal of the source S into a lead a through a two-position switch 43 to energize the sealed beam lamp unit 39. If the switch 42 is moved to the "R" position, current will flow into a lead b and will operate to energize a series relay coil 44 interposed therein. The series relay coil 44 controls the relay switch 43 and actuates it to a second position whereby the electrical circuit in lead a is broken and an electrical circuit in a lead c will be completed. Hence, current will flow from the lead b through the relay switch 43 and into the lead c to energize the motor 24 and the pilot light 41. Current will also flow through the relay coil 44 to energize the bulb 35. Thus, the stationary beam of light produced by the sealed beam lamp unit 39 will be extinguished and a gyrating warning beam of light will be produced.

It should be noted that when the relay coil 44 is deenergized, the circuit through lead c is opened, thereby extinguishing the pilot light 41. If the bulb 35 burns out, the relay coil 44 is also deenergized, and energization of the motor 24 or the pilot light 41 is precluded. In such event, the circuit can be restored to normal operating condition only by the replacement of the burned-out bulb with an operative bulb 35. It will be evident that this arrangement permits the pilot light 41 to be a positive and reliable signal under all conditions since energization of the pilot light will occur only when a warning light is being produced.

Referring now to Figure 5, a modification of the basic circuit shown and described in connection with Figure 4 is provided in the form of an additional lead $d$ which may be connected on the source side of the selector switch 42 and to the bead $b$, thereby by-passing the selector switch 42.

Interposed in the lead $d$ is a manual switch 45 and a switch 46 controlled by a pressure-responsive device 47. The pressure-responsive device 47 may be incorporated into the conduits of a fluid brake system such as is normally provided upon a railroad train or the like and may be adapted to respond to variations in air pressure occurring in the conduits of the fluid brake system such as occur upon the application of brakes upon slowing down the train or coming to a full stop. It will be evident that this particular arrangement provides for a denomination of white operation by red operation. This is true because even though the selector switch 42 is moved to position "W" whereby the sealed beam lamp unit 39 is energized to produce a stationary beam of white light, if the manual switch 45 is closed, actuation of the pressure-responsive device 47 will close the switch 46, thereby completing the electric circuit. Current will flow through the lead $d$ into the lead $b$ to energize the series relay coil 44. The series relay coil 44 will, in turn, actuate the relay switch 43 to its second position, thereby extinguishing the sealed beam lamp unit 39 and energizing the bulb 35, the motor 24, and the pilot light 41.

It will, of course, be understood that the pressure-responsive device 47 indicated in schematic form only may be of the type incorporating a manually operable reset plunger. Thus, the light will continue to be energized until such a time as the device 47 is manually reset or other provision is made.

In Figure 6, a schematic circuit diagram which is somewhat similar to that shown in Figures 4 and 5 is shown. However, the circuit shown in Figure 6 is adopted for automatic control by a voltage regulator of a conventional railroad generator. Thus, it may be seen that the selector switch 42 is by-passed by a lead $d'$ in which is interposed a relay switch 46' controlled by a series relay coil 48 and a manually controlled switch 45'.

The series relay coil 48 is connected in circuit with a reverse current contactor 49 of a conventional voltage regulator 50 normally incorporated as a part of the usual control device for a train generator.

It may be noted at this point that train generators are generally arranged so as to permit actuation of a voltage regulator in response to attainment of predetermined quantitative values of speeds by the railroad vehicle carrying the generator set. Thus, it is contemplated that the reverse current contactor 49 may be actuated in response to slowing down of a railroad vehicle below a critical speed which will be of the same quantitative value as the critical speed of the voltage regulator 50.

When the series relay coil 48 is deenergized, the switch 46' will be closed, and if the manual switch 45' is also closed, current will flow through the positive terminal of the source $S$ into the lead $d'$ and through the switch 46', and through the switch 45' and into the lead $b$. The series relay coil 44 will then be energized, and even though the selector switch 42 is in the "W" position as and for producing a stationary beam of light, the relay switch 43 will be actuated to its second position, thereby extinguishing the sealed beam lamp unit 39 and energizing the motor 24, the bulb 35, and the pilot light 41 to produce a gyrating beam of warning light.

As shown on Figure 6, the control circuit may also be provided with an additional manual switch 51 in a lead $e$ connected across the positive terminal of the source $S$ and the lead $d'$ in such a manner as to permit selective by-passing of the automatically controlled switch 46', the manual controlled switch 45', and the selector switch 42. Thus, when the switch 51 is closed, current will flow from the positive terminal of the source $S$ into the lead $b$ and will produce a gyrating beam of warning light in accordance with the method previously described.

While we have shown particular embodiments of our invention, it will, of course, be understood that we do not wish to be limited thereto since many modifications and alternative constructions may be made without departing from the spirit or scope thereof.

We claim as our invention:

1. In a warning light structure, a pair of spaced-apart light source means, a common support member carrying both of said light source means and aligning same to project co-directional beams of light along a substantially parallel path, each of said light source means including a lens through which the respective beams of light are projected, one of said lens being colored, and circuit means to selectively energize each of said light source means.

2. In a warning light structure as defined in claim 1, an electric motor means to concurrently oscillate said light source means when one of said light source means is energized.

3. In a warning light structure as defined in claim 1, a movable reflector for one of said light source means, and an electric motor means to concurrently oscillate said reflector upon energization of said one light source means.

4. In an electric control circuit for a warning light structure as defined in claim 1, a selector switch, circuit means controlled thereby, relay means interposed in said circuit means and switch means controlled thereby, one of said light source means having a first electrical means to be controlled interposed in circuit with said relay means, the other of said light source means having a second electrical means to be controlled interposed in said circuit means whereby said selector switch may be selectively actuated to energize said second electrical means and to energize said relay means whereby said relay means actuates its associated switch means to deenergize said second electrical means and to energize said first electrical means.

5. Illumination apparatus comprising in combination, a first lamp unit adapted to produce a stationary beam of light, a second lamp unit adapted to produce a gyrating beam of light, and electrical apparatus for controlling said illumination apparatus, said electrical apparatus comprising a selector switch, circuit means controlled thereby, said circuit means including a manually operated switch, a pressure-responsive switch, a relay means, a two-position switch controlled by said relay means, a bulb and motor means for said second lamp unit and a bulb for said first lamp unit, whereby said selector switch may be selectively actuated to energize said first lamp unit as and for producing a stationary beam of light and to energize said relay means whereby said relay means actuate said two-position switch to deenergize said first lamp unit and energize said second lamp unit to produce a gyrating beam of light, said manual switch and said pressure-responsive switch being arranged in said circuit so as to permit dominating control over said selector switch whereby when said manual switch is actuated for energizing said first lamp unit, said pressure-responsive switch will operate to energize said relay means in response to a predetermined variation in a pressure condition whereby said second lamp unit is energized and said first lamp unit is deenergized.

6. Illumination apparatus comprising, in combination, a first lamp unit adapted to produce a stationary beam of light, a second lamp unit adapted to produce a gyrating beam of light, electrical control means for said apparatus comprising a voltage regulator for controlling a relay, a selector switch, circuit means controlled thereby, said circuit means including a manually-operated switch, a relay-operated switch actuatable by said relay controlled by said voltage regulator, a relay means, a two-position switch controlled by said relay means, a bulb and motor means for said second lamp unit and a bulb for said first lamp unit, whereby said selector switch may be selectively actuated to energize said first lamp unit as and for producing a stationary beam of light and to energize said relay means whereby said relay means actuates said two-position switch to deenergize said first lamp unit and energize said second lamp unit to produce a gyrating beam of light, said manual switch and said relay-operated switch being arranged to said circuit so as to permit dominating control over said selector switch whereby when said manual switch is actuated for energizing said first lamp unit said relay-operated switch will operate to energize said relay means in response to a predetermined variation in a voltage condition as manifested by said voltage regulator whereby said second lamp unit is energized and said first lamp unit is deenergized.

7. Illumination apparatus comprising, in combination, a case having an open end, a mounting plate, means adjustably suspending said mounting plate in said case for adjustable alignment relative thereto, a first lamp unit on said mounting plate adapted to project a stationary beam of light through said open end of said case, a second lamp unit on said mounting plate adapted to produce a gyrating beam of light through said open end of said case, the optic axes of said beams of light relatively adjustable through adjustment of said plate alignment relative to said case, and electric control means for said apparatus comprising a selector switch, circuit means controlled thereby, relay means interposed in said circuit means and switch means controlled thereby, a bulb and motor means for said second lamp unit interposed in circuit with said relay means, and a bulb for said first lamp unit interposed in said circuit means whereby said selector switch may be selectively actuated to energize said first lamp unit as and for producing a stationary beam of light and to energize said relay means whereby said relay means actuates its associated switch means to deenergize said first lamp unit and energize said second lamp unit to produce a gyrating beam of light.

8. Illumination apparatus comprising, in combination, a case, a mounting plate adjustably suspended in said case for adjustable alignment relative thereto, a first lamp unit on said mounting plate adapted to produce a stationary beam of light, a second lamp unit on said mounting plate adapted to produce a gyrating beam of light, the optic axes of said beams of light being adjustable by alignment of said mounting plate relative to said case, and electrical apparatus for controlling said illumination apparatus, said electrical apparatus comprising a selector switch, circuit means controlled thereby, said circuit means including a manually-operated switch, a pressure-responsive switch, a relay means, a two-position switch controlled by said relay means, a bulb and motor means for said second lamp unit and a bulb for said first lamp unit, whereby said selector switch may be selectively actuated to energize said first lamp unit as and for producing a stationary beam of light and to energize said relay means whereby said relay means actuate said two-position switch to deenergize said first lamp unit and energize said second lamp unit to produce a gyrating beam of light, said manual switch and said pressure-responsive switch being arranged in said circuit so as to permit dominating control over said selector switch whereby when said manual switch is actuated for energizing said first lamp unit said pressure-responsive switch will operate to energize said relay means in response to a predetermined variation in a pressure condition whereby said second lamp unit is energized and said first lamp unit is deenergized.

9. Illuminating apparatus comprising in combination, a case, a mounting plate adjustably suspended in said case for adjustable alignment relative thereto, a first lamp unit on said mounting plate adapted to produce a stationary beam of light, a second lamp unit on said mounting plate adapted to produce a gyrating beam of light, the optic axes of said beams of light being adjustable by alignment of said mounting plate relative to said case, and electrical control means for said apparatus comprising a voltage regulator for controlling a relay, a selector switch, circuit means controlled thereby, said circuit means including a manually-operated switch, a relay-operated switch actuatable by said relay controlled by said voltage regulator, a relay means, a two-position switch controlled by said relay means, a bulb and motor means for said second lamp unit and a bulb for said first lamp unit, whereby said selector switch may be selectively actuated to energize said first lamp unit as and for producing a stationary beam of light and to energize said relay means whereby said relay means actuates said two-position switch to deenergize said first lamp unit and energize said second lamp unit to produce a gyrating beam of light, said manual switch and said relay-operated switch being arranged to said circuit so as to permit dominating control over said selector switch whereby when said manual switch is actuated for energizing said first lamp unit, said relay-operated switch will operate to energize said relay means in response to a predetermined variation in a voltage condition as manifested by said voltage whereby said second lamp unit is deenergized.

10. An electric control circuit for a combination headlight and movable warning light comprising a selector switch, circuit means controlled thereby, said circuit means including a manually-operated switch, a pressure-responsive switch, a relay means, a two-position switch controlled by said relay means, a bulb and motor means for producing a movable beam of light and a second bulb means for producing a stationary beam of light, whereby said selector switch may be selectively actuated to energize said second bulb means as and for producing a stationary beam of light and to energize said relay means whereby said relay means actuates said two-position switch to deenergize said second bulb means and energize said bulb and motor means to produce a movable beam of light, said manual switch and said pressure-responsive switch being arranged in said circuit so as to permit dominating control over said selector switch whereby when said manual switch is actuated for energizing said second bulb means, said pressure-responsive switch will operate to energize said relay means in response to a predetermined variation in a pressure condition whereby said bulb and motor means is energized and said second bulb means is deenergized.

11. A control circuit for a combination illumination apparatus adapted to produce a stationary beam of light and an oscillating beam of warning light comprising a voltage regulator for controlling a relay, selector switch, circuit means controlled thereby, said circuit means including a relay-operated switch, said relay-operated switch controlled by said voltage regulator, a manually-operated switch, a relay means, a two-position switch controlled by said relay means, a bulb and motor means for an oscillating beam lamp unit and a bulb for a sealed beam lamp unit, whereby said selector switch may be selectively actuated to energize said sealed beam lamp unit as and for producing a stationary beam of light and to energize said relay means whereby said relay means actuates said two-position switch to deenergize said sealed beam lamp unit and to energize said oscillating lamp unit to produce an oscillating beam of light, said manual switch and said relay-controlled switch being arranged in said circuit so as to permit dominating control over said selector switch whereby when said manual switch is actuated for energizing said sealed beam lamp unit, said relay-operated switch will operate to energize said relay means in response to a predetermined voltage variation as manifested by said voltage regulator whereby said oscillating lamp unit is energized and said sealed beam lamp is deenergized.

12. Illumination apparatus comprising, in combination, a case, a mounting plate adjustably suspended in said case for adjustable alignment relative thereto, a first lamp unit on said mounting plate adapted to produce a stationary beam of light, a second lamp unit on said mounting plate adapted to produce a gyrating beam of light, the optic axes of said beams of light being adjustable by alignment of said mounting plate relative to said case, and electrical apparatus for controlling said illumination apparatus, said electrical apparatus comprising a selector switch, circuit means controlled thereby, said circuit means including a manually-operated switch, a by-passing switch controlled by condition-sensitive elements, a relay means, a two-position switch controlled by said relay means, a bulb and motor means for said second lamp unit and a bulb for said first lamp unit, whereby said selector switch may be selectively actuated to energize said first lamp unit as and for producing a stationary beam of light and to energize said relay means whereby said relay means actuate said two-position switch to deenergize said first lamp unit and energize said second lamp unit to produce a gyrating beam of light, said manual switch and said by-passing switch being arranged in said circuit so as to permit dominating control over said selector switch, whereby when said manual switch is actuated for energizing said first lamp unit, said by-passing switch will operate to energize said relay means in response to a predetermined variation from a reference condition whereby said second lamp unit is energized when said first lamp unit is deenergized.

13. An electric control circuit for a combination headlight and movable warning light comprising a selector switch, circuit means controlled thereby, said circuit means including a manually-operated switch, a switch controlled by condition-responsive elements, a relay means, a two-position switch controlled by said relay means, a bulb and motor means for producing a movable beam of light and a second bulb means for producing a stationary beam of light, whereby said selector switch may be selectively actuated to energize said second bulb means as and for producing a stationary beam of light and to energize said relay means, whereby said relay means actuate said two-position switch to deenergize said second bulb means and energize said bulb and motor means to produce a movable beam of light, said manual switch and said two-position switch having condition-responsive elements being arranged in said circuit so as to permit dominating control over said selector switch whereby when said manual switch is actuated for energizing said second bulb means, said switch having condition-responsive elements will operate to energize said relay means in response to a predetermined variation from a reference condition, whereby said bulb and motor means is energized and said second bulb means is deenergized.

THOMAS E. McDOWELL.
ARTHUR C. HEEHLER.

References Cited in the file of this patent

UNITED STATES PATENTS

| Number | Name | Date |
| --- | --- | --- |
| 2,353,082 | Roedding et al. | July 14, 1944 |
| 2,409,046 | Kennelly | Oct. 8, 1946 |
| 2,446,333 | Kennelly | Aug. 3, 1948 |
| 2,455,497 | Kennelly | Dec. 7, 1948 |